(12) United States Patent
Pelly et al.

(10) Patent No.: US 7,607,017 B2
(45) Date of Patent: Oct. 20, 2009

(54) EMBEDDING DATA IN MATERIAL

(75) Inventors: Jason Charles Pelly, Reading (GB); Stephen Mark Keating, Reading (GB)

(73) Assignee: Sony United Kingdom Limited, Weybridge (GB)

( * ) Notice: Subject to any disclaimer, the term of this patent is extended or adjusted under 35 U.S.C. 154(b) by 652 days.

(21) Appl. No.: 10/231,146

(22) Filed: Aug. 29, 2002

(65) Prior Publication Data

US 2003/0061489 A1 Mar. 27, 2003

(30) Foreign Application Priority Data

Aug. 31, 2001 (GB) ................................. 0121200.0

(51) Int. Cl.
*H04L 9/32* (2006.01)
(52) U.S. Cl. ...................................................... 713/176
(58) Field of Classification Search .................. 713/176
See application file for complete search history.

(56) References Cited

U.S. PATENT DOCUMENTS

| | | | | |
|---|---|---|---|---|
| 4,323,921 A * | 4/1982 | Guillou | ........................ | 725/31 |
| 4,890,319 A | 12/1989 | Seth-Smith et al. | | |
| 5,606,609 A * | 2/1997 | Houser et al. | ................ | 713/179 |
| 5,956,716 A * | 9/1999 | Kenner et al. | .................. | 707/10 |
| 6,460,023 B1 * | 10/2002 | Bean et al. | ...................... | 705/54 |
| 6,639,997 B1 * | 10/2003 | Katsura et al. | .............. | 382/100 |
| 6,725,459 B2 * | 4/2004 | Bacon | .......................... | 725/31 |
| 2001/0000265 A1 * | 4/2001 | Schreiber et al. | ............. | 713/201 |
| 2001/0017704 A1 * | 8/2001 | Akiyama | .................... | 358/1.9 |
| 2001/0032313 A1 * | 10/2001 | Haitsma et al. | .............. | 713/176 |
| 2001/0051996 A1 * | 12/2001 | Cooper et al. | ................ | 709/217 |
| 2002/0016776 A1 * | 2/2002 | Chu et al. | ...................... | 705/52 |
| 2002/0114013 A1 * | 8/2002 | Hyakutake et al. | .......... | 358/3.28 |
| 2002/0191810 A1 * | 12/2002 | Fudge et al. | ................. | 382/100 |

FOREIGN PATENT DOCUMENTS

| | | |
|---|---|---|
| EP | 0 860 986 A2 | 8/1998 |
| EP | 1 237 352 | 3/2004 |
| EP | 1 811 419 A2 | 7/2007 |
| JP | 11-272564 | 10/1999 |
| JP | 2000-184172 | 6/2000 |
| JP | 2000-242605 | 9/2000 |
| JP | 2002-41398 | 2/2002 |
| JP | 2002-236669 | 8/2002 |

OTHER PUBLICATIONS

Yoshiura Hiroshi, et al., "Digital Watermarking and It's Applications", Multimedia System Creating 21st Century, vol. 80, No. 7, 1998, 4 pages (with partial English translation).

* cited by examiner

*Primary Examiner*—Kambiz Zand
*Assistant Examiner*—Jason K Gee
(74) *Attorney, Agent, or Firm*—Oblon, Spivak, McClelland, Maier & Neustadt, L.L.P.

(57) ABSTRACT

A method of transferring information signals representing still images, video audio and/or other data comprises sending, the information signals to a recipient apparatus or "viewer" 10 from a server 2 via a network 12. Data indicative of whether or not further data is to be embedded in the information signals is also sent either with the signals or separately. The further data is embedded in the information signals at the viewer 10 in dependence upon the indicative data. The further data is perceptible in the information signals as to degrade them.

49 Claims, 5 Drawing Sheets

TEMPLATE BIT MAP

WATER MARKED IMAGE

EMBEDDING DATA IN MATERIAL

BACKGROUND OF THE INVENTION

1. Field of the Invention

The present invention relates to embedding data in material. "Material" means one or more of still images, video material, audio material, and data material. Material is represented by information signals which most preferably are digital signals.

2. Description of the Prior Art

It is known to embed data in material to identify the ownership of the material and/or to trace the provenance of the material to detect and protect against copyright infringement. Such embedding of data is known as watermarking.

Watermarks may be "robust" in that they are difficult to remove from the material. Robust watermarks are useful to trace the provenance of material which is processed in some way either in an attempt to remove the mark or to effect legitimate processing such as video editing or compression for storage and/or transmission.

In the case of images, whether still or moving, a visible watermark is useful to allow e.g. a customer to view the image, e.g. over the Internet, to determine whether they wish to buy it but without allowing the customer access to the unmarked image they would buy. The watermark degrades the image and the mark should not be removable by the customer. Visible watermarks are also used to determine the provenance of the material into which they are embedded. Watermarks may also be applied to audio material and to other data.

It is known to use "Digital Rights Management" software to protect material against misuse. Many companies provide such software, e.g. SealedMedia, Microsoft, InterTrust Technologies, and others. Such software, which is designed to be secure against unauthorised modification, allows the providers of material to securely distribute material over computer networks and to control the use of the material by users.

U.S. Pat. No. 4,890,319 discloses a subscription television system for distributing programme material protected by copyright to subscribers. The system comprises a transmitter including a data insertion circuit for inserting a control bit in a transmitted signal comprising other control data and the protected programme material. A receiver of the system includes a memory for storing a pre-assigned subscriber identification. Upon receipt and identification of the control bit at the receiver, the receiver inserts the subscriber identification into the programme material so that any unauthorized copy made of the programme material may by found to include the subscriber identification. The addition of the user identification is imperceptible to the user but will show up on any copies of the programme material. The user identification is inserted into a television programme "for but a single frame" and "is barely detectable to the subscriber's eye, such that no significant impairment in picture quality results".

SUMMARY OF THE INVENTION

According to a first aspect of the present invention, there is provided a method comprising sending to a recipient apparatus information signals and data indicative of whether or not further data is to be embedded in the information signals, and embedding the further data in the information signals at the recipient apparatus in dependence upon the indicative data, wherein the said further data, when embedded in the information signals, is perceptible, degrading the information signals.

In accordance with the present invention, it is envisaged that material may be made available to many potential recipients some of whom may have a good business relationship with the provider and others not. Some may be regarded by the material provider as being more trustworthy than others. For example, the material provider may have long standing contractual relations with some recipients who have proven to be wholly trustworthy, whilst other recipients may be new to the material provider and in the absence of other information will be regarded, initially, as untrustworthy.

Thus, only one version of the material may be produced by the material provider for all recipients. The further data is embedded in the material at the reception apparatus of those recipients deemed to require the use of further data.

Embedding further data in material can increase the amount of data in the material. In the case of video, the data would be added to every frame and the increase in data may be large. By sending only the indicative data only a relatively small amount of data is sent to the customer in addition to the material. The indicative data may be simply a flag indicating whether or not the further data is to be added in which case the increase in data sent is very small, e.g. one bit.

Data defining the form of the further data to be embedded may be sent in addition to the indicative data When such data is sent, it is sent once for a whole example of material. In the case of video for example, it would result in a smaller data overhead than adding further data to every frame of the video. The data defining the form of the further data may, for example, simply be data defining a mask which masks part of an image, or it may identify the provider or the owner of the material represented by the information signals.

Most preferably, in accordance with an embodiment of the invention, the information signals are sent in data compressed form to the recipient apparatus and may be stored in data compressed form before being sent. Embedding further data in compressed signals is difficult, possibly requiring the decompression and recompression of the signals. Adding further data to signals before they are compressed may increase the amount of data to be compressed. In accordance with this embodiment of the invention, the compressed signals are decompressed at the recipient apparatus and the further data is added to the decompressed signals for at least some recipients. Thus the same compressed information may be supplied to all recipients, avoiding the need to process signals differently for different recipients before the signals are sent to the recipients except for varying the indicative data according to the recipient.

In preferred embodiments of the invention, the recipient apparatus has a store for storing the information signals. Preferably the information signals are sent to the recipient apparatus in compressed form as described above and are stored in compressed form. The indicative data determines whether the further data is to be embedded in the information signals at the recipient apparatus. In the preferred embodiment, the further data is embedded when the information signals are retrieved from the store for outputting to the recipients. The indicative data may be changed by the provider without needing to resend the information signals, thus allowing the stored information signals to be retrieved by the recipient without the embedded further data but under the control of the provider.

For example, the provider may offer an image for sale. The provider sends the image to a customer with indicative data indicating the customer can view the image at no cost only if it is visibly watermarked. The customer stores the image in the recipient apparatus. The watermarked image is displayed at no cost to the customer but initially with the visible watermark in accordance with the indicative data. The customer pays for the image. The provider then sends new indicative data allowing the image to be retrieved from the store without the watermark.

Digital rights management is preferably applied. In addition to allowing the information signals to be securely sent to the recipient apparatus, digital rights are defined which restrict the use of the information signals at the recipient apparatus. For example information signals may not be copied, printed exported to another apparatus or stored other than in the apparatus regardless of whether or not the indicative data is set to embed the further data and regardless of whether or not a customer has paid for the information signals.

According to a second aspect of the present invention, there is provided a computer program product arranged to carry out the method of said first aspect when run on a suitable computer system. The program may be provided by a data providing medium, e.g. a data storage medium or a transmission medium.

According to a third aspect of the present invention, there is provided a system for providing information signals, the system comprising one or more servers and one or more clients linked to the server(s) by a data transmission network, the server(s) being arranged to:

a) apply digital rights management to the information signals to protect the information signals against unauthorised access thereto and to allow access thereto at the client(s) according to the digital rights defined by the digital rights management, b) provide to the client(s) indicative data indicating whether further data is to be embedded in the information signals at the client(s), and the client(s) being arranged to:

c) dependent on the indicative signal, embed the further data in the information signals before providing the information signals to the user(s), and d) allow access to the information signals according to the digital rights;

wherein the further data, when embedded in the information signals, is perceptible degrading the information signals.

According to a fourth aspect of the present invention, there is provided a computer program product comprising a digital rights management module together with a module operable to embed further data into information signals protected by the digital rights management module which further data is perceptible in the information signals and a module operable to cause the data embedding module to embed the further data into the information signals in response to indicative data indicating the further data is to be embedded.

According to a fifth aspect of the present invention, there is provided an apparatus for processing information signals received thereby, the signals being protected by digital rights management, the apparatus having digital rights management module operable to conditionally release the information signals to a user, and a module operable to embed further data in the information signals before release to the user dependent on indicative data indicating whether or not the further data is to be embedded in the information signals; wherein the further data, when embedded in the information signals, is perceptible in the information signals.

Digital rights management comprises encrypting the information signals representing material to be sent from the server to the viewer and associating the encrypted data with rights data defining the rights of the user. The rights data disables functions which the user is not allowed to use. For example, a user may be allowed to store and view an image but not print it, not copy it and not export it to another viewer.

The rights data may be encrypted with, or separately from, the information signals. One or more digital signatures may be used to protect the encrypted information signals and /or the rights data According to a sixth aspect of the present invention, there is provided an apparatus for sending information signals to a corresponding receiver, the apparatus comprising a module operable to apply digital rights management to the information signals to protect the signals from unauthorised access thereto and to allow a recipient user conditional access, according to the digital rights defined by the digital rights management, to the information signals at the corresponding receiver, and a data producer operable to produce indicative data indicating whether or not further data is to be embedded in the information signals at the corresponding receiver which further data is perceptible with information signals, the apparatus being arranged to send to the corresponding receiver, indicative data and data defining the form of the further, perceptible, data to be embedded in the information signals.

According to a seventh aspect of the present invention, there is provided a method of providing an information signal to a user thereof, the method comprising the steps of;

determining the status of a potential user;

sending an information signal to a recipient apparatus of the user together with data indicative of whether or not further data is to be embedded in the information signal at the recipient apparatus in accordance with the determined status of the user;

embedding the further data in the information signal at the recipient apparatus if so indicated by the indicative data, the further data being perceptible in the information signal so as to degrade it; and allowing the user access to the information signal without the further data embedded therein if the user complies with at least one predetermined condition.

"Embed" as used herein is generic to superimposing further data on the information signals, adding the further data to the information signals and otherwise changing the information signals so that the further data is in the information signals. The further data may be simply blanking applied to part of the information signals.

BRIEF DESCRIPTION OF THE DRAWINGS

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
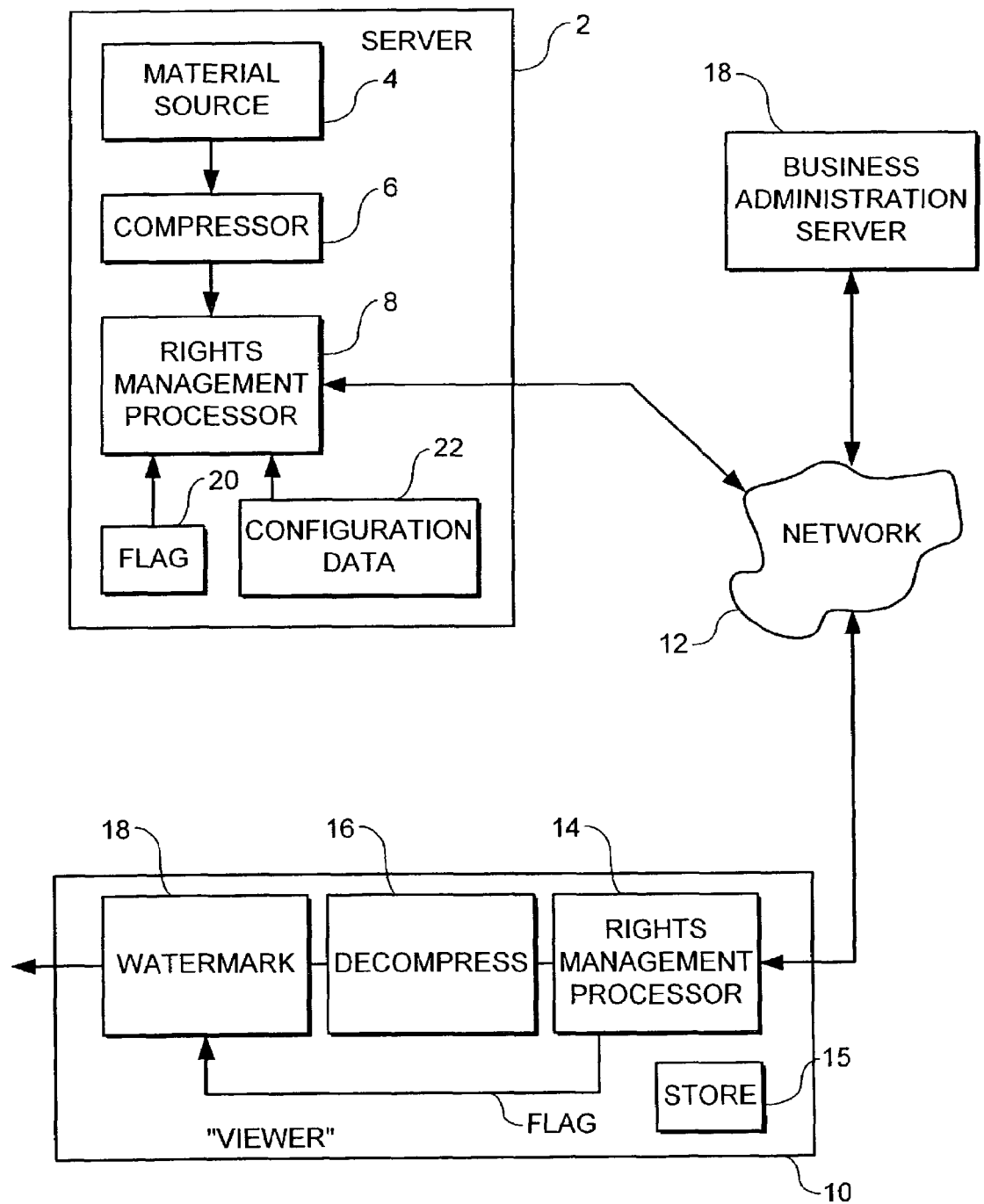
FIG. 1 is a schematic diagram of a networked system for providing information signals to users.

Referring to FIG. 1, a first server 2 stores digital information signals representing video material, optionally with audio material, in a store 4. The store 4 may be any suitable store, including solid state memory, magnetic disc, optomagnetic disc and tape. The video and audio material is stored in compressed form or the server 2 includes a compressor 6 for compressing the material using any suitable compression technique. One or more "viewers" 10 (only one shown) are linked or linkable to the server 2 via a network 12, which may be any suitable network including for example the internet. The viewers may be Personal Computers (PCs), Personal Digital Assistants (PDAs), MP3 players, mobile phones or any other suitable programmable computing device. Each viewer includes a decompressor 16 corresponding to the compressor 6 in the server 2.

The server 2 applies digital rights management processing to the compressed material. Digital rights management processors are available from a variety of sources including SealedMedia, Microsoft, InterTrust Technologies, and others. Such software, which is designed to be secure against unauthorised modification, allows the providers of material to securely distribute material over computer networks and to control the use of the material by users. When material is to be transmitted across the network 12, the digital rights management processor 8 securely packages the material using encryption and preferably also a digital signature. The package includes data defining the rights of a user of a viewer to access the material. That data may be included in a file, referred to herein as the "rights file" within the secure package. The viewer contains a corresponding processor 14 which decrypts the package making the material available to the user according to the defined rights. For example, the user may be allowed only to view the material, but not store, distribute, print or otherwise process the material. The rights processor 14 in the viewer disables any functions of the viewer 10 which exceed the defined rights. If a user requests the transfer of protected material and his or her viewer does not have the necessary processor, the processor may be downloaded e.g. from server 2 via the network 12 as a plug-in in known manner.

In accordance with embodiments of the present invention, the viewer 10 is provided with a processor 18 for adding a watermark to the material represented by the information signals after the information signals are decompressed. If the watermark processor 18 is not already installed in the viewer, the lack of the watermark processor 18 is detected by the rights management processor 14 in known manner and a watermark processor 18 is downloaded e.g. from server 2 via the network 12 as a plug-in in known manner.

Figure 2:
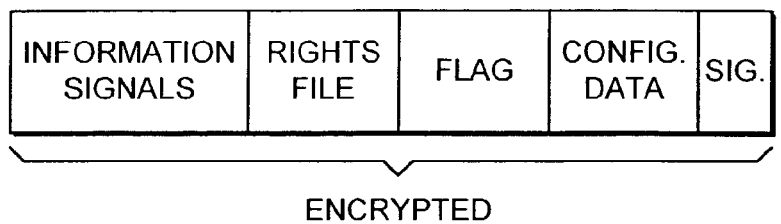
FIG. 2 is a schematic diagram of an encrypted data package.
Figure 3:
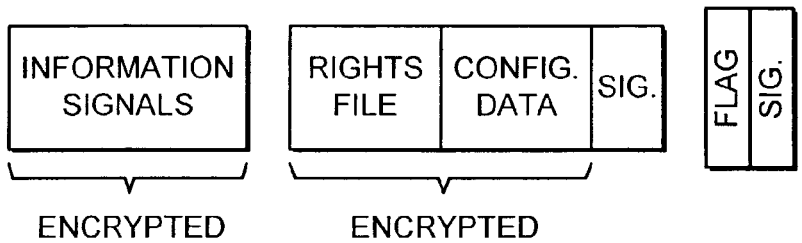
FIG. 3 is a schematic diagram of encrypted data packages which may be used instead of that shown in FIG. 2.

As shown in the example of FIG. 1, a flag is included in the rights file, which flag indicates whether a perceptible watermark is to be added to the material at the viewer 10 before it is released to the user. The flag is set at the server 2. The flag is protected by encryption and/or by a digital signature. The encryption and/or digital signature applied to the flag may be the encryption and/or digital signature applied to the rights file or may be separate therefrom. In the example of FIG. 2, the information signals and rights file including the flag are included in one encrypted package, which optionally also includes configuration data defining the configuration of the watermark as will be discussed in more detail below. As shown in the example of FIG. 3, the information signals, the rights file and the flag are in separate packages. The information signals and the rights file are separately encrypted. The flag is protected by a digital signature (SIG).

Figure 4:
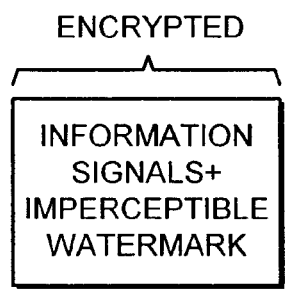
FIG. 4 is a schematic diagram of a data package.

As shown in FIG. 4, the information signals, whether in the example of FIG. 2 or 3, may include an imperceptible watermark.

Figure 5:
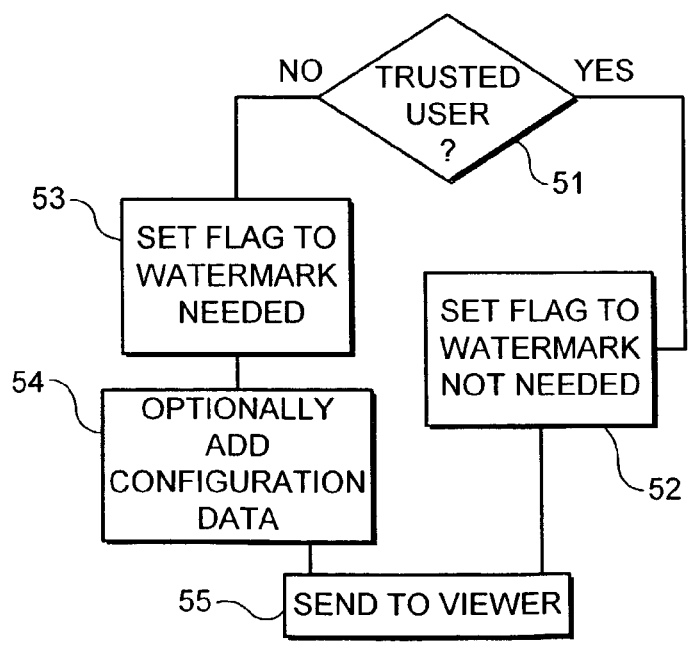
FIG. 5 is a flow diagram relating to the setting of a flag.

Referring to FIG. 5, assuming the user of the viewer requests a download of material from the server 2, the server 2 detects (51) whether the user is known or is a new user. If the user is known and has a good established business relationship with the provider, the flag is set (52) to indicate that no watermark is added to the material at the viewer. If the user is a new user and/or does not have a good business relationship with the provider, the flag is set (53) to cause the perceptible watermark to be added at the viewer 10 as also indicated by block 20 in FIG. 1. If the material is a still or moving image, the watermark is visible to the user in the material and degrades the material.

In an alternative embodiment, the provider of the material, knows in advance to whom he or she will send material, and knows the business status of the users. The provider thus sets the flag appropriately before sending the material without the need for the user to request a download of the material.

In another embodiment of the invention, in addition to sending the flag, the provider sends (54) in the secure package a watermark configuration file which contains data defining the form of the watermark to be added to the material at the viewer 10. The configuration data may be stored in a store 22 in the server 2. This enables different watermarks to be added to different material. The watermarks may for example identify the owners of material, who may be different from the providers of the material. The watermark configuration data is protected by the encryption and, if provided, the digital signature which protects the secure package.

Figure 6:
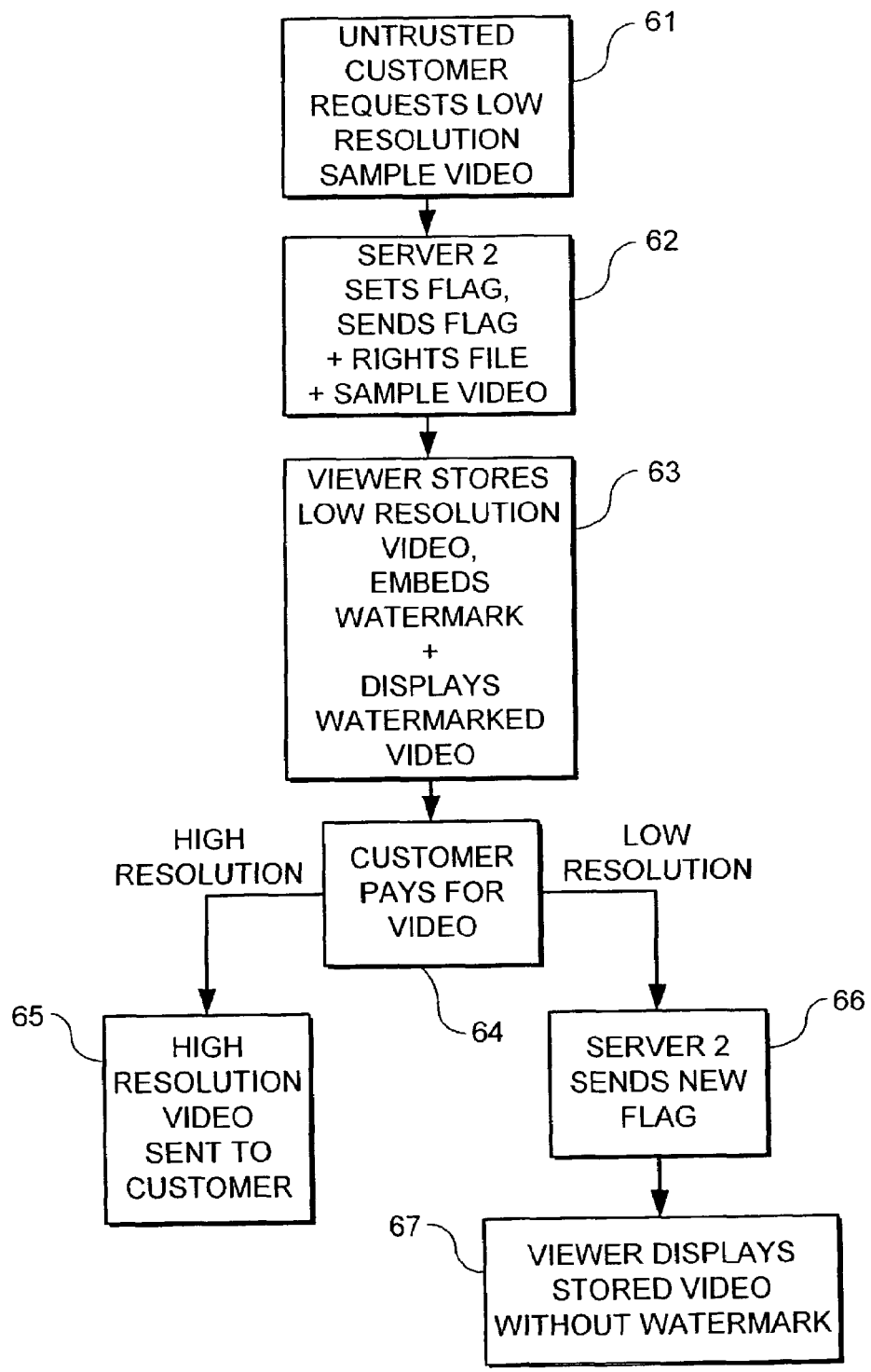
FIG. 6 is a flow diagram of the provision of information signals to a customer.

The system of FIG. 1 may be used in various ways, examples of some ways being described as follows:

a) A provider of material offers high resolution video to customers. The provider requires a high price to be paid for the high resolution video. The provider provides low resolution samples to customers free of charge so they can preview the video before buying. However the provider wishes to protect the low resolution video from misuse by customers. Referring to FIG. 6, a customer previously unknown to the provider requests (61) a download of low resolution video from the server 2. The flag is set (62) at the server to add a watermark at the viewer of the customer. The low-resolution video is downloaded (62) free of charge to the viewer. The low resolution video is stored in the store 15 in the viewer and the watermark is added to the video at the viewer (63). If the customer then pays (64) for release of high resolution video, the high resolution video is sent (65) to the customer e.g. on tape or disc by post or courier, or is securely downloaded via the network 12.

b) Alternatively, the stored low resolution video may be adequate for the customer's purposes and the customer pays (64) for the low resolution video. The provider then merely resends (66) the flag the value of which is changed so that that the customer can retrieve (67) the video previously stored in the store 15 without the subsequent addition of the watermark. This avoids the need to download to the viewer new video.

Figure 7:
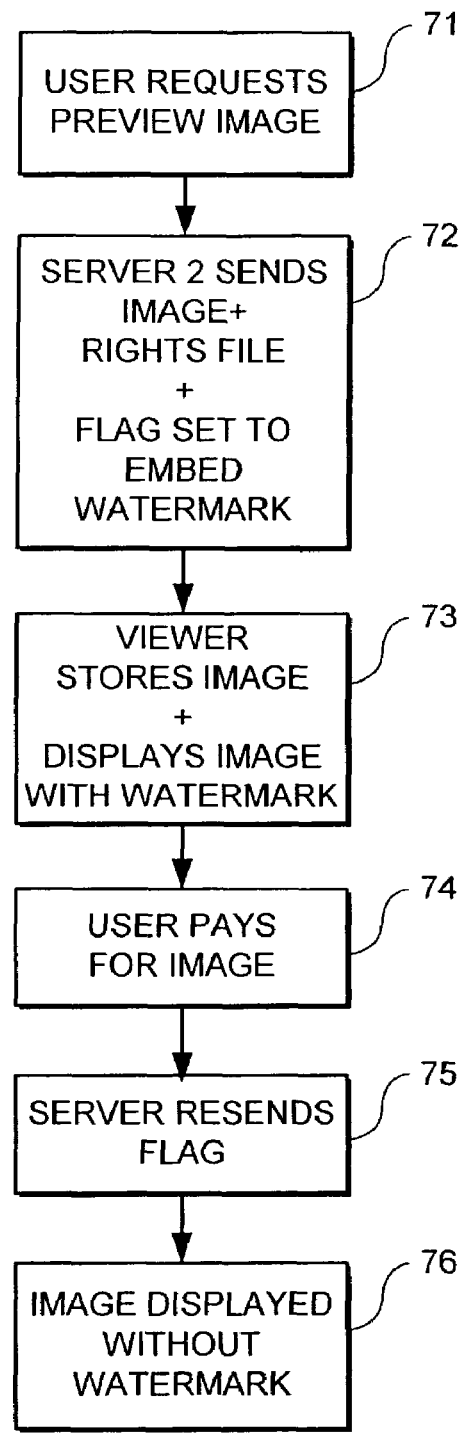
FIG. 7 is another flow diagram of the provision of information signals to a customer.

If a customer is known to the provider and has a good business relationship with the provider, the low resolution video may be sent with the flag set to not add the watermark to the video at the viewer.

c) In another alternative, a customer may view low resolution watermarked video as described in a) but decide they cannot make a decision on whether to buy the video without viewing a higher resolution sample. The customer may request that a high resolution sample be sent to them. For example they may e-mail the request to the provider. The provider then sends a data carrier to the customer by post or courier, the data carrier storing a high resolution sample which is visibly watermarked. Only when the customer pays for the video and agrees to comply with any other business conditions is an unwatermarked version of the video sent to the customer.

d) Referring to FIG. 7, the provider offers images for sale to customers. The provider offers preview images to customers for no charge or only a small charge. The provider wishes to protect the preview images from misuse by customers. When a customer requests (71) a download of a preview image from the server, the provider sets (72) the flag to add a watermark to the downloaded image so that the image can be used only for preview. The image is stored (73) in the store 15 in the viewer. The customer views (73) the image with the watermark in it as the preview image. The customer then pays (74) for the unwatermarked image. The provider then merely resends (75) the flag the value of which is changed so that that the customer can retrieve (76) the image previously stored in the store 15 without addition of the watermark.

One or more conditions other than payment, or additional to payment, may be applied to users who wish to access the information signals without embedded further data. The conditions are chosen by the provider according to their business judgement for example.

Examples a) to d) may be applied equally to video and images.

In the examples a) to d) the digital rights management restricts the customers access to the video or images supplied to the viewer. The restrictions include for example allowing the customer to view an image or video on the viewer but not copy, print or export the image or video, or store it in another store. Those restrictions are applied independently of the status of the flag which determines whether a watermark is, or is not, to be embedded in the video or image at the viewer. Those restrictions are independent of business conditions such as payment which the provider may impose. Thus even when a customer has paid for a video or image, and the flag has been set to not embed the watermark, the customer may only view the video or image but not copy, print, or export the video, or store it in another store.

Imperceptible watermarks may be included in the material provided by the server 2 and/or added in the viewer.

Embedding a Visible Watermark in Video or in an Image

In preferred embodiments of the invention, the watermark which is added at the viewer is a visible watermark added to the image material in the spatial domain. The following describes, by way of example, one way of adding a spatial domain watermark to video or image data.

Figure 8A:
FIG. 8A is a schematic diagram of an original image.
Figure 8B:
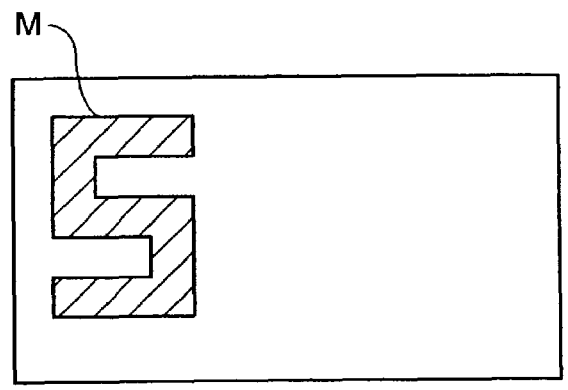
FIG. 8B is a schematic diagram of a bit map of a perceptible watermark.

Referring to FIG. 8A, the luminance of an original image in the spatial domain is represented by pixels as is conventional. Each pixel is represented by an n bit digital number. Referring to FIG. 8B, a bitmap, which is referred to hereinafter as a template, contains data indicating which pixels of the original image are to be modified and which are to remain unmodified. In the example shown in FIG. 8B, pixels m within the shaded "S" shaped area are to be modified and the other pixels remain unmodified. "S" is only an example and any other shape can be used. Also, a plurality of areas may be provided and they can be of different shapes. The bitmap is an example of the watermark configuration data mentioned above.

Figure 8C:
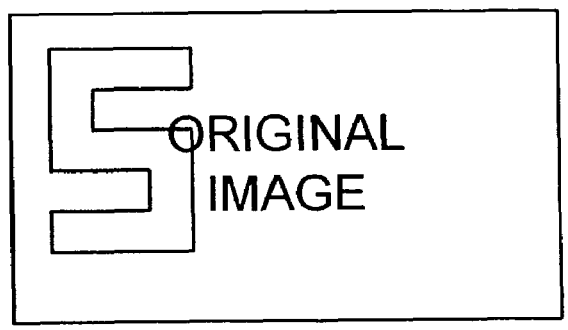
FIG. 8C is a schematic diagram of a combination of the perceptible watermark and the original image.

In the example shown in FIG. 8C, pixels in the area of the original image corresponding to the "S" shaped area of the template are modified. The modification changes the value of the pixels. The modification of the image degrades the image. The modification is preferably such that it cannot be easily removed by an unauthorised person. The modification is such that the image, or sufficient of the image, is recognisable so that a potential buyer can determine whether they wish to buy the image. However the buyer cannot remove the modification.

Examples of Modifying Pixels.

In one example all the pixel values indicated by the template are set to black thus masking-off part of the image. The user cannot remove the watermark without access to the unwatermarked image in the store 15 and access is denied by the digital rights management processor 14.

The image could be a color image in which color is represented by digital values. The image could be modified by modifying the values representing color in the manner described above.

The preceding description assumes that the same modification is applied to all pixels or groups of pixels. However the algorithm may vary from pixel to pixel or from one group of pixels to another group of pixels. For that purpose the template store may store plural-bit numbers for each pixel or group. For example if the plural-bit number has two bits then for example 00=no change to a pixel or group, 01=modification 1, 10=modification 2, and 11=modification 3. Preferably a random order of the three modifications occurs in the template. The modifications may be different values of luminance or chrominance applied to the pixels or groups of pixels.

In another example, a logo is superimposed on the image.

Any one or more of the original image, the modified image and the authorised copies thereof may have data imperceptibly embedded therein for copyright protection and/or to identify the image.

Whilst the invention has been illustrated by reference to video and image signals, it may be applied to audio signals or to data.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method, comprising:

sending from a source apparatus to a recipient apparatus information signals and data indicative of whether or not further data is to be embedded in the information signals at the recipient apparatus, storing the information signals without the further data embedded therein at the recipient apparatus, embedding the further data in the information signals at the recipient apparatus in dependence upon the indicative data; wherein the further data, when embedded in the information signals, is perceptible, determining, by the source apparatus, whether a user of the recipient apparatus complies with at least one predetermined rule governing access to the information signals, resending, when it is determined that the user has complied with the at least one predetermined rule, the indicative data from the source apparatus without resending the information signals, the resent indicative data indicating that the further data is not to be embedded in the information signals at the recipient apparatus, setting the indicative data to allow the user the access to the information signals without the embedded further data if the user complies with the at least one predetermined rule, and making the stored information signals available to the user without the further data embedded therein.

2. The method according to claim 1, wherein the indicative data is sent together with the information signals.

3. The method according to claim 1, wherein the indicative data is sent separately from the information signals.

4. The method according to claim 1, wherein data defining the form of the further data is sent with the information signals.

5. The method according to claim 4, wherein the indicative data is protected against modification.

6. The method according to claim 4, wherein the indicative data is associated with a digital signature dependent on the indicative data.

7. The method according to claim 4, wherein the indicative data is encrypted.

8. The method according to claim 4, wherein the information signals are encrypted.

9. The method according to claim 1, wherein a user of the recipient apparatus is allowed the access to the information signals without the embedded further data if the user has paid for the access.

10. The method according to claim 1, wherein the at least one predetermined rule includes a payment by the user for the access to the information signals without the embedded further data.

11. The method according to claim 1, further comprising: embedding imperceptible data in the information signals.

12. The method according to claim 1, further comprising: compressing the information signals,
sending the compressed signals to the recipient apparatus, decompressing the information signals at the recipient apparatus, and
embedding the further data in the decompressed information signals in dependence upon the indicative data.

13. The method according to claim 1, wherein the information signals are video signals.

14. The method according to claim 1, wherein the further data is embedded in every frame of a video signal.

15. The method according to claim 1, wherein the information signals represent still images.

16. The method according to claim 1, wherein the information signals are audio signals.

17. The method according to claim 1, wherein the information signals represent audio and video content.

18. The method according to claim 1, wherein the information signals are data signals.

19. The method according to claim 1, further comprising: defining digital rights which control the use of the information signals at the recipient apparatus.

20. A computer readable medium including computer instructions that cause a processor to implement the method of claim 1.

21. The method according to claim 1, wherein the at least one predetermined rule includes a payment by the user for the access to the information signals.

22. The method according to claim 1, wherein the information signals sent to the recipient apparatus together with the indicative data are a low quality representation of content, corresponding to the information signals, for preview by the user.

23. The method according to claim 1, wherein the user is allowed access to a high quality representation of content, corresponding to the information signals, when the user complies with the at least one predetermined rule.

24. A system for providing information signals, the system comprising:
one or more servers; and
one or more client(s) linked to the server(s) by a data transmission network,
the server(s) being configured to:
apply digital rights management to the information signals to protect the information signals against unauthorised access thereto and to allow access thereto at the client(s) according to digital rights defined by the digital rights management,
send to the client(s) indicative data indicating whether or not further data is to be embedded in the information signals at the client(s),
determine whether a user of the client(s) complies with at least one predetermined rule governing access to the information signals,
resend, when it is determined that the user has complied with the at least one predetermined rule, the indicative data without resending the information signals from the one or more servers, the resent indicative data indicating that the further data is not to be embedded in the information signals at the client(s), and
set the indicative data to allow the user the governed access to information signals stored at the client(s) without the embedded further data if the user complies with the at least one predetermined rule;
and the client(s) being configured to:
store the information signals without the further data embedded therein,
dependent on the indicative signal, embed the further data in the information signals before providing the information signals to the user(s), and
allow the access to the information signals according to the digital rights,
wherein the further data, when embedded in the information signals, is perceptible.

25. The system according to claim 24, wherein imperceptible data is embedded in the information signals, in addition to the further data.

26. The system according to claim 24, wherein the server (s) are configured to provide compression encoded information signals to the client(s), the client(s) being configured to decompress the information signals and to embed the further data in the decompressed information signals in dependence upon the indicative data.

27. The system according to claim 24, wherein the information signals are video signals.

28. The system according to claim 24, wherein the information signals represent still images.

29. The system according to claim 24, wherein the information signals are audio signals.

30. The system according to claim 24, wherein the information signals represent audio and video content.

31. The system according to claim 24, wherein the information signals are data signals.

32. The system according to claim 27, wherein the client(s) are configured to embed the further data in every frame of a video signal.

33. An apparatus for processing information signals protected by digital rights management techniques, the apparatus comprising:
a digital rights management module configured to receive the information signals and data indicative of whether or not further data is to be embedded in the information signals at the apparatus, and to conditionally release the information signals from a memory of the apparatus to a user, the conditional release being without embedding the further data if the user complies with at least one predetermined rule; and an embedder configured to embed the further data in the information signals before the conditional release to the user dependent on the indicative data, the indicative data being re-received by the apparatus without a re-reception of the information signals, when it is determined that the user has complied with the at least one predetermined rule, the re-received indicative data indicating that the further data is not to be embedded in the information signals at the apparatus, wherein the embedder is configured to embed the further data, which is perceptible to the user, in the information signals.

34. The apparatus according to claim 33, further comprising:

a decompressor configured to decompress compressed information signals before the embedder embeds the further data therein.

35. The apparatus according to claim 33, wherein the embedder is configured to additionally embed data, which is imperceptible to the user, in the information signals.

36. The apparatus according to claim 33, wherein the embedder is configured to receive the indicative data from the digital rights management module.

37. The apparatus according to claim 33, wherein the embedder is configured to create data to be embedded in response to data configuration information.

38. The apparatus according to claim 37, wherein the embedder is configured to receive the data configuration information from the digital rights management module.

39. The apparatus according to claim 33, wherein the embedder is configured to embed the further data in every frame of a video signal.

40. The apparatus according to claim 33, wherein the digital rights management module is configured to conditionally release the information signals from the memory of the apparatus to the user without embedding the further data, based on the re-received indicative data.

41. An apparatus for sending information signals to a corresponding receiver, the apparatus comprising:

a module configured to apply digital rights management techniques to the information signals to protect the signals from unauthorised access thereto and to provide a recipient user conditional access to the information signals at the corresponding receiver;

a data producer configured to produce indicative data indicating whether or not further, perceptible, data is to be embedded in the information signals at the corresponding receiver, the apparatus being configured to send, to the corresponding receiver, the indicative data and data defining a configuration of the further, perceptible, data to be embedded in the information signals, and a determining unit configured to determine whether the recipient user complies with at least one predetermined rule governing the conditional access to the information signals and to resend the indicative data without sending the information signals, to provide the recipient user the conditional access to the information signals without the embedded further, perceptible, data if the recipient user complies with the at least one rule.

42. The apparatus according to claim 41, wherein the apparatus is configured to send the indicative data to the receiver with the information signals, the indicative data being protected from unauthorised access thereto.

43. The apparatus according to claim 41, wherein the apparatus is configured to send the indicative data to the receiver separately from the information signals, the indicative data being protected from unauthorised access thereto.

44. The apparatus according to claim 41, wherein the apparatus is configured to send the configuration data to the receiver with the information signals, the configuration data being protected from unauthorised access thereto.

45. The apparatus according to claim 44, wherein the apparatus is configured to send the configuration data to the receiver separately from the information signals, the configuration data being protected from unauthorised access thereto.

46. The apparatus according to claim 41, further comprising:

a module configured to compress the information signals.

47. The apparatus according to claim 41, wherein the determining unit is configured to resend the indicative data to the corresponding receiver without sending the information signals, the resent indicative data indicating that the corresponding receiver is not to embed the further, perceptible, data in the information signals.

48. A method implemented with an embedding apparatus, the method comprising:

receiving information signals and data indicative of whether further data is to be embedded in the information signals at the embedding apparatus;

re-receiving the indicative data at the embedding apparatus without a re-reception of the information signals, when a user has complied with at least one predetermined rule, the re-received indicative data indicating that the further data is not to be embedded in the information signals;

conditionally releasing the information signals from a memory to the user, the information signals being released without the further data embedded when the user complies with the at least one predetermined rule; and embedding, with the embedding apparatus, the further data in the information signals before the conditional release, dependent on the indicative data, the further data being perceptible to the user when the further data is embedded in the information signals.

49. A method implemented by a rights management apparatus, comprising:

applying, with the rights management apparatus, digital rights management techniques to information signals to protect the information signals from unauthorised access thereto and to provide a recipient user conditional access to the information signals;

producing, using the rights management apparatus, indicative data indicating whether further, perceptible, data is to be embedded in the information signals;

sending the indicative data and data defining a configuration of the further, perceptible, data;

determining, at the rights management apparatus, whether the recipient user complies with at least one predetermined rule governing the conditional access to the information signals; and resending, using the rights management apparatus, the indicative data without sending the information signals, to provide the recipient user the conditional access to the information signals without the further, perceptible, data being embedded in the information signals, when the recipient user complies with the at least one rule.

* * * * *